United States Patent [19]

Holly

[11] 4,343,068

[45] Aug. 10, 1982

[54] METHOD AND APPARATUS FOR UNIDIRECTIONAL FORMATION OF A PLUG-FORMED PATTY WITH CLEANOUT FEATURE

[76] Inventor: James A. Holly, 5728 W. 129th St., Crestwood, Ill. 60445

[21] Appl. No.: 226,211

[22] Filed: Jan. 19, 1981

[51] Int. Cl.$^3$ .............................................. A22C 7/00
[52] U.S. Cl. ........................................ 17/45; 17/32; 426/513; 425/197
[58] Field of Search ............................ 17/32; 426/513; 425/197, 198, 227, 229

[56] References Cited

U.S. PATENT DOCUMENTS 3,052,919 9/1962 Rayburn ......................... 425/227 X
3,851,355 12/1974 Hughes ..................................... 17/32

*Primary Examiner*—Willie G. Abercrombie

*Attorney, Agent, or Firm*—Dressler, Goldsmith, Shore, Sutker & Milnamow, Ltd.

[57] ABSTRACT

A method and apparatus are disclosed in which mold parts are provided for defining a mold opening and in which a foraminous member is provided with apertures communicating between an upstream side and downstream side of the member. The foraminous member is disposed with the downstream side adjacent the mold opening. Pressurized food material is forced from the upstream side of the foraminous member through the apertures to the downstream side of the foraminous member and into the mold opening as discrete extrudate masses which together define a packed array forming the patty. At least some of the mold parts are then moved away from the foraminous member to expose the downstream side of the foraminous member and a plurality of rigid probe members are inserted into at least some of the foraminous member apertures from the downstream side to dislodge tissue fibers that may have lodged in the upstream side of the member.

6 Claims, 4 Drawing Figures

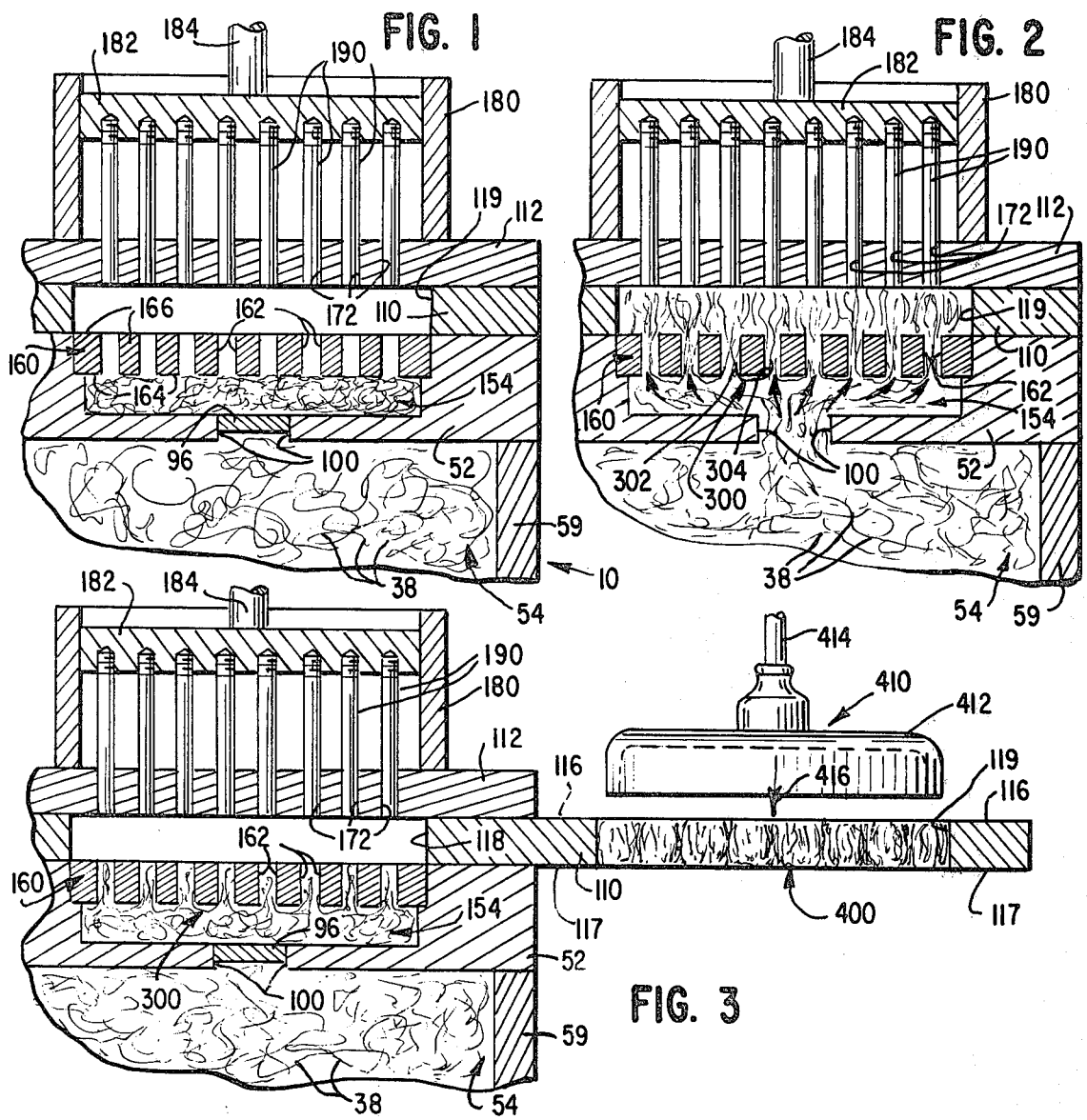
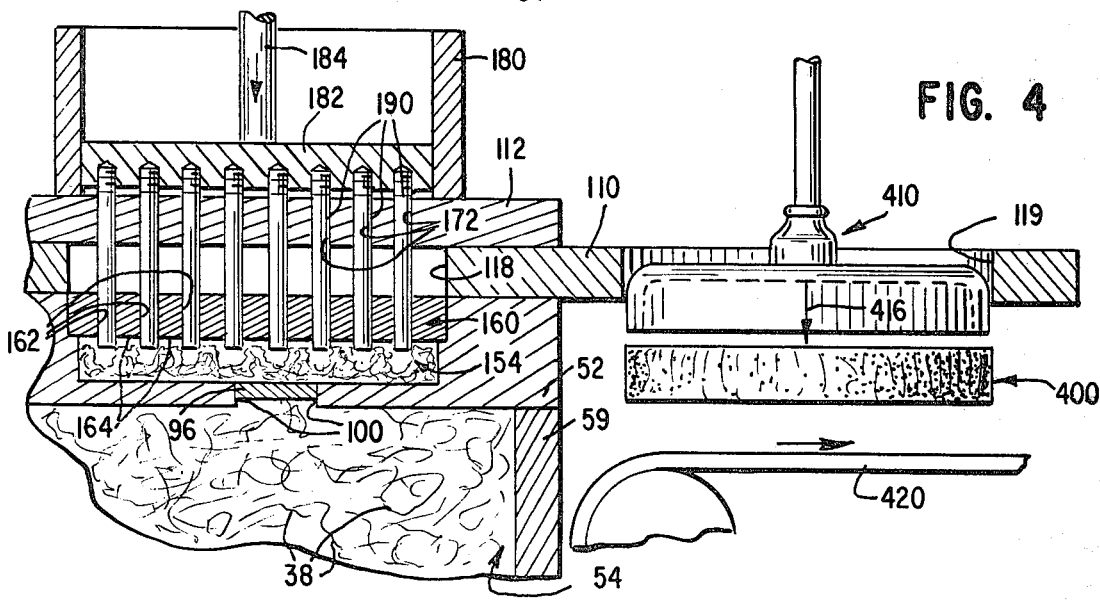

METHOD AND APPARATUS FOR UNIDIRECTIONAL FORMATION OF A PLUG-FORMED PATTY WITH CLEANOUT FEATURE

DESCRIPTION

Technical Field

This invention relates to the fabrication of a patty of plastic food material containing tissue fibers, such as are found in ground meat and the like.

BACKGROUND OF THE INVENTION

A variety of machines has been proposed and used for forming patties of plastic food material, especially of ground meat. Examples of such machines include those disclosed in the U.S. Pat. Nos. 3,293,688, 3,623,188, and 4,113,415.

The inventor of the present invention has developed improved methods and apparatus for making a patty of plastic food material, and especially of meat, that has improved characteristics. Examples of such improved methods and apparatus are disclosed in the copending U.S. patent application of Harry H. Holly entitled "Ground Food Patty and Method and Apparatus for Making Same," Ser. No. 25,031, filed Mar. 29, 1979. A type of improved patty disclosed in that patent application is formed from a plurality of discrete plugs or masses of food material which are packed together in an array to enclose or encompass air spaces in the interstitial regions. This type of patty promotes more rapid and uniform cooking of the patty and aids in retention of the cooking juices.

According to one method for making the above-described patty according to the above-referenced Holly patent application, the plastic food material is, among other things, forced through a plurality of cavities or apertures defined in a foraminous member. The material is forced from the foraminous plate into a mold cavity to form the patty of relatively high porosity.

Some food material, especially ground meat and the like, contains tissue fibers or strings of tissue which, during working of the material, tend to separate from the other components of the material and which, when the material is forced through apertures in a foraminous member, may lodge on the upstream side of the foraminous member. Unless the lodged tissue fibers are removed from time to time from the upstream side of the foraminous member, an undesirable buildup of tissue fibers may occur and hinder continued movement of the food material through the foraminous member.

In the above-referenced Holly patent application, the inventor discloses a method and apparatus for overcoming the problem of tissue fiber buildup on the upstream side of the foraminous member. Specifically, in one of the embodiments disclosed in that patent application, food material is first forced in one direction into and/or through the apertures of the foraminous member and is then subsequently forced in the opposite direction through the apertures of the foraminous member into a mold cavity to form the patty. When the patties are repeatedly made according to this cycle, any tissue fibers that may undesirably lodge on one side of the foraminous member during the movement of the material in one direction are subsequently dislodged by the movement of the material through the apertures in the second direction. In this way, tissue fibers are continually dislodged from either side of the foraminous member.

It would be desirable to provide a relatively simple method for forming relatively high porosity patties of plastic food material by forcing the food material through apertures in a foraminous member wherein tissue fibers may be at least intermittently dislodged from the foraminous member. Additionally, it would be desirable to provide a method and apparatus for effecting such a patty-making process wherein the amount of movement of the food material is reduced to a minimum so as to avoid undesirable effects of excessive working of the food material.

SUMMARY OF THE INVENTION

According to the teachings of the present invention, the technical problem of dislodging tissue fibers from a foraminous member and of forming a relatively high porosity patty with a minimum of food material movement is solved by the provision of a novel method and apparatus for cleaning tissue fibers from the foraminous member.

To this end, a method is disclosed for forming a patty of plastic food material containing tissue fibers, including ground meat and the like, wherein the method includes the initial steps of providing mold parts defining a mold opening and at least a portion of a mold cavity having the shape of at least a portion of the exterior surface of said patty, providing a foraminous member having an upstream side and a downstream side with apertures therein communicating between said upstream side and said downstream side, said member being disposed with the downstream side adjacent said mold opening thereby defining a portion of said mold cavity, forcing said food material under pressure from the upstream side of said foraminous member through said apertures to the downstream side of said foraminous member and into said mold cavity as discrete extrudate masses which together define a packed array forming said patty, moving at least some of the mold parts away from said foraminous member to carry said formed patty therewith, and finally providing a pluralty of rigid probe members, each of said probe members associated with a foraminous member aperture, and inserting said probe members into at least some of said foraminous member apertures from said downstream side for dislodging tissue fibers that may have lodged on the upstream side of said member.

Also disclosed is an apparatus for effecting the abovedescribed method of molding a patty. The apparatus includes a foraminous member having a plurality of apertures communicating between an upstream side and a downstream side, means defining a food reservoir adjacent the upstream side of said foraminous member, a mold plate defining a mold opening adapted to be moved between a first position adjacent said foraminous member and a second position spaced away from said foraminous member, said mold opening defining at least a portion of a mold cavity into which said food material is forced only once and in only one direction from said food reservoir on the upstream side of said foraminous member through said foraminous member apertures to form a molded patty each time said mold plate is moved to said first position, means for moving said mold plate with said mold opening filled with a patty away from said first foraminous member, and probe means for pushing tissue fibers, said probe means spaced from said foraminous member and adapted to be moved into the apertures in said foraminous member when said mold plate mold opening is moved away from said first foraminous member whereby tissue fibers that may have lodged on the upstream side of said foraminous member are dislodged and deposited back in said food material reservoir.

Numerous other advantages and features of the present invention will become readily apparent from the following detailed description of the invention and embodiments thereof, from the claims, and from the accompanying drawings.

BRIEF DESCRIPTION OF THE DRAWINGS

In the accompanying drawings forming part of the specification, and in which like numerals are employed to designate like parts throughout the same, FIG. 1 is a fragmentary, partial cross-sectional view of a portion of one embodiment of an apparatus for molding a patty of plastic food material which contains tissue fibers;

FIG. 2 is a view similar to FIG. 1 but showing the apparatus in a position during a subsequent step in the process of the molding of the patty wherein food material is being forced into the mold cavity;

FIG. 3 is a view similar to FIG. 2 but showing a subsequent step in the process wherein the molded patty is moved to the patty ejecting position; and FIG. 4 is a view similar to FIG. 3 but showing a subsequent step in the process wherein the molded patty is ejected from the apparatus and wherein the probe members have been moved into apertures of the foraminous member to dislodge tissue fibers therefrom.

DESCRIPTION OF THE PREFERRED EMBODIMENT

While this invention is susceptible of embodiment in many different forms, there are shown in the drawings and will herein be described in detail a preferred embodiment of the invention. It will be understood, however, that the present disclosure is to be considered as an exemplification of the principles of the invention and is not intended to limit the invention to the embodiment illustrated.

The precise shapes and sizes of the components herein described are not essential to the apparatus unless othewise indicated.

It will be understood that reference is made herein, and in the claims, to various terms such as "food material," "tissue," "fiber," and "plastic" are used herein in a non-technical sense, and are intended to include various substances exhibiting the characteristics discussed hereinafter in more detail and to which the present invention is directed.

For ease of description, the apparatus disclosed herein will be described in a normal operating position and terms such as upper, lower, horizontal, etc., will be used with reference to the normal operating position. It will be understood, however, that the apparatus may be manufactured, stored, transported, and sold in an orientation other than that normal operating position described.

The apparatus disclosed herein has certain conventional drive mechanisms, food material pressurizing mechanisms, food material receiving hopper structures, and control mechanisms the details of which, though not fully illustrated or described, will be apparent to those having skill in the art and an understanding of the necessary functions of such mechanisms.

The apparatus disclosed herein may be constructed of many types of materials. The choice of material in some cases is dependent upon a particular application involved and other variables, as those skilled in the art will appreciate.

An apparatus for forming or molding a patty of plastic food material containing tissue fibers, including ground meat and the like, in accordance with the teachings of the present invention is illustrated in FIG. 1 as being incorporated in an automatic patty molding machine 10. The machine 10 includes certain conventional mechanisms and structures. The mechanisms and structures include means for receiving a supply of plastic food material, such as ground meat and the like, means for pressurizing the food material, means for defining at least a portion of a mold cavity for receiving the pressurized food material to form a molded patty, and means for moving the molded patty to a molded patty ejecting position where the molded patty may be ejected from the apparatus, either by hand, or by a suitable automatic ejecting mechanism.

Examples of such structures and mechanisms are described and illustrated in the above-referenced copending Holly patent application Ser. No. 25,031.

The novel apparatus disclosed in the instant application is adapted for use with, and is illustrated herein as incorporated in, a modification of the apparatus described in the above-referenced Holly patent application Ser. No. 25,031. In this description, only such portions of the apparatus disclosed in the Holly application Ser. No. 25,031 as are revelant to the present apparatus have been illustrated, these portions being described only in sufficient detail as to afford an understanding of the relation to the novel apparatus disclosed herein. However, the entire disclosure of the Holly patent application Ser. No. 25,031, insofar as it is consistent with the present disclosure, is hereby incorporated in, and made a part of, the present disclosure by reference thereto. Such modifications as are necessary to adapt the novel apparatus to the machine disclosed in the Holly patent application Ser. No. 25,031 are described in detail hereinafter.

The machine 10 includes a pressurizable feed chamber or food material reservoir 54 defined, in part, by an end wall 59 and a top wall or cover plate 52. The plastic food material 38 is fed under pressure from a hopper (not illustrated) into feed chamber 54. The feed chamber or reservoir 54 may be identical to the feed chamber 54 illustrated in FIG. 3 of the above-referenced Holly patent application Ser. No. 25,031 and described in detail in the specification of that application. The plastic food material 38 is moved or conveyed forward by a mechanism capable of pressurizing the material within the chamber of 54. Though such a mechanism is not illustrated in the present disclosure, any number of suitable conventional mechanisms may be employed. An example of one such suitable mechanism is that disclosed and illustrated in the above-referenced Holly patent application Ser. No. 25,031 and in U.S. Pat. No. 3,293,688. Any suitable feed mechanism may be used with the apparatus and the specific feed mechanism construction, per se, forms no part of the present invention.

In any event, regardless of the specific type of feed mechanism employed in the apparatus 10, the food material 38 is moved forwardly (left-to-right, as viewed in FIG. 1) to fill the entire food chamber or reservoir 54. The feed mechanism continues feeding the material until the material is packed tightly within the forward end of the feed chamber 54 and begins to exert an outwardly directed pressure on the inside surfaces of the feed chamber 54.

As illustrated in FIG. 1 (and as also illustrated and described in the above-referenced Holly patent application Ser. No. 25,031), the cover plate 52 defines an aperture 100 in which is received a slideable closure plate 96. The closure plate 96 is actuated by a suitable mechanism (not illustrated in FIG. 1) to intermittently open and close aperture 100 whereby the pressurized food material 38 is intermittently permitted to be forced out of the chamber 54. One such mechanism for reciprocating the closure member 96 is the piston and linkage assembly illustrated in FIGS. 3–8 of the above-referenced Holly patent application Ser. No. 25,031 and described in detail in the specification thereof, with reference to elements 82, 84, 86, 88, 90, 92, and 94. Any suitable actuating mechanism may be used with the closure plate 96 and the specific mechanism, per se, forms a part of the present invention.

On the top of the cover plate 52 is slidably disposed a reciprocating transfer plate or mold plate 110 as best illustrated in FIG. 3. Above the mold or transfer plate 110 is a support plate 112. The transfer or mold plate 110 has two parallel, flat surfaces 116 and 117 by which the mold plate 110 is specifically adapt to slide between the lower cover plate 52 and the upper mounting plate 112.

The transfer plate 110, the cover plate 52, and the support plate 112 are positioned in an operable relationship substantially identical to that disclosed for the identically numbered elements in the above-referenced Holly patent application Ser. No. 25,031.

The plate 110 has a transfer cavity or cleanout opening, such as aperture 118 (FIG. 3), for receiving a cleanout device to be explained in detail hereinafter. The plate 110 also has an aperture or mold opening 119 in which a patty of food material is eventually molded in conjunction with the underlying surface of the cover plate 52 and the overlying surface of the support plate 112 as will be explained in detail hereinafter.

The transfer or mold plate 110 is reciprocated between a first, or patty molding, position and a second, or patty discharge or ejecting, position by any suitable reciprocating drive mechanism of which there are many known to those skilled in the art. In FIGS. 1 and 2, the transfer or mold plate 110 is shown in the first or patty molding position while in FIGS. 3 and 4 the transfer plate 110 is shown in the second or patty discharge position. One suitable mechanism for reciprocating the plate 110 is illustrated and described in the above-referenced Holly patent application Ser. No. 25,031 with reference therein to FIGS. 1 and 2 and to drive mechanism elements 120, 122, 124, 126, and 128. The specific design of the mechanism per se for effecting the reciprocating movement of the transfer or mold plate 110 is not part of the present invention. However, the combination of a suitable mechanism with other features of the apparatus described herein constitutes an embodiment of the apparatus for effecting a novel method for molding a patty in accordance with the teachings of the present invention.

The cover plate 52 of the apparatus 10 differs from the identically numbered cover plate illustrated and described in the above-referenced Holly patent application Ser. No. 25,031 in an essential respect. Specifically, in the apparatus 10 illustrated in FIGS. 1–4 herein, the cover plate 52 defines a cavity or food material reservoir 154 which is in communication with the other food material reservoir or feed chamber 54 through the aperture 100 when the closure plate 96 is actuated to open the aperture 100. Further, at one side of the reservoir 154, a first foraminous member 160 is disposed below the slidable mold plate 110.

The first foraminous member 160 may have a generally circular or disk-like configuration and has a plurality of apertures 162 therein. The apertures are preferably cylindrical (though other shapes may be used) and the apertures extend completely through the member 160. The first foraminous member 160 has an upstream side 164 adjacent the food material reservoir 154 and a downstream side 166 adjacent the mold plate 110. When the mold transfer plate 110 is in the first (patty molding) position, the mold opening 119 is adajcent the downstream side of the first foraminous member 160. On the other hand, when the mold plate 110 is in the second (patty ejecting) position (FIG. 3), the cleanout opening 118 is adjacent the first foraminous member 160.

The first foraminous member 160 may be a separate insert member contained within, and supported by, the cover plate 52 as illustrated in the figures. However, the first foraminous member 160 may also be just an integral portion of a unitary cover plate 52.

Preferably the apertures 162 in the first foraminous member 160 are arranged in a generally uniform way across the disk-like member 160. The size of the cavities 162, the cross-sectional shape of the cavities 162, and the array configuration and spacing of the apertures 162 may be varied as desired depending upon the type of food material being molded and the desired characteristics of the molded product.

Typically, the mold opening 119 and the cleanout opening 118 each have a circular or cylindrical configuration. However, neither the mold opening 119 nor the cleanout opening 118 need be cylindrical and the shapes of the openings 119 and 118 need not be identical.

Opposite the first foraminous member 160, and on the other side of the mold plate 110, the support plate 112 is provided with a plurality of apertures 172 which extend completely through the support plate 112. In this respect, support plate 112 may be said to be a second foraminous member. The apertures 172 are preferably cylindrical in configuration and the longitudinal axis of each aperture 172 is preferably coincident with the longitudinal axis of an aligned aperture 162 in the first foraminous member 160.

Mounted to the top of the support plate 112 is a cylinder 180. The cylinder 180 slidably receives a piston or disk-like member 182 which is reciprocated vertically within the cylinder 180 by means of connecting rod 184 which may be driven by any suitable mechanism (not illustrated.) Threadingly mounted within the piston 182 are a plurality of probe means or members 190. Each probe member 190 is associated with, and slidably received within, a particular aperture 172 in the upper support plate 112.

The probe members 190, the structure of the cylinder 180, and the nature of the mechanism for reciprocating rod 184 are such that the ends of the probe members 190 will enter the apertures 162 of the first foraminous member when the rod 184 is moved to its downwardmost position as illustrated in FIG. 4. Preferably a portion or end of each probe member 190 extends beyond the upstream side 164 of the first foraminous member when the probe members 190 are fully downwardly extended as illustrated in FIG. 4.

A novel method for forming a patty of plastic food material containing tissue fibers, including ground meat and the like, will next be described in relation to the operation of the apparatus 10 illustrated in FIGS. 1-4. A sequence of operation of the apparatus 10 will be described and that sequence will follow the normal steps utilized to mold the food material into the patty and to effect the novel cleanout of the apertures 162 of the first foraminous member 160.

FIG. 1 illustrates the apparatus 10 with the various movable elements arranged in initial positions for beginning a cycle of making a patty of plastic food material. The food material 38 is shown pressurized in the chamber or food material reservoir 54. The closure plate 96 is illustrated in a closed position blocking flow of pressuzied food material 38 from reservoir 54 to the smaller reservoir 154 above the closure plate 96. However, food material is illustrated as also occupying the volume defined within reservoir 154. Typically, food material remains within reservoir 154 following the termination of the previous patty molding cycle. However, even if such food material had been cleaned out of the reservoir 154 prior to the start of patty making cycle to now be described, the operation of the various parts of the apparatus 10 would be unchanged.

The upper reservoir 154 may be regarded, for purposes of this description and understanding the claim terminology, as a "first reservoir," while the lower reservoir 54 may be regarded as the "second reservoir."

With the parts of the apparatus 10 positioned as illustrated in FIG. 1, the mold plate 110 is oriented in the first (patty molding) position wherein the mold opening 119 is disposed between the first foraminous member 160 and the opposing, second foraminous member portion of the support plate 112.

Next, the food material pressurizing mechanism (not illustrated) is operated to pressurize the food material in the chamber or second reservoir 54. As described above, a suitable mechanism, which may be responsive to a desired pressurization level in chamber 54, may be provided to operate the closure plate 96 to open the aperture 100 and allow communication between the first reservoir 154 and the second reservoir 54. With the food material still being pressurized in the reservoir 54, a portion of the food material 38 passes from reservoir 54 through aperture 100 into the first reservoir 154 as best illustrated in FIG. 2 wherein the plate 96 is shown retracted out of the plane of the figure, and hence out of view, to open the aperture 100. As the material 38 flows into reservoir 154 to combine with the material that was already in the reservoir 154, some of the material is forced out of the reservoir 154 upwardly through the apertures 162 in the first foraminous member 160 and into the mold opening 119 which, in cooperation with the first foramanious member 160, plate 112 and retracted probe members 190, defines the patty mold cavity.

The pressurized food material 38 flows through the formanious member 160 into the mold cavity as discrete plugs or masses of material formed within, or by, the apertures 162 of the first foraminous member 160. On the downstream side 162 of the foraminous member 160, the discrete masses of material may expand circumferentially somewhat and surface portions of adjacent plugs come into contact. Portions of the plugs may impinge upon the mold cavity surface defined by the ends of the probe members 190 and by the substantially coplanar interstitial surface of support plate 112.

The discrete plugs or masses of food material passing into the mold cavity may also twist and turn to some extent, and, in some cases, may form corkscrew-like configurations. In any case, the food material is eventually forced through the foraminous member 160 so that the discrete extrudate masses in the mold cavity above the first foraminous member 160 together define a packed array forming the patty. Voids or air spaces exist between the packed extrudate masses in the patty to give the patty a relatively high degree of porosity.

When forming a patty of plastic food material that contains tissue fibers, such as are found in ground meat, some of the tissue fibers may tend to separate somewhat from the rest of the food material and some of these separating tissue fibers may be not be forced completely into the mold cavity. This situation is illustrated in FIG. 2 where a tissue fiber 300 is shown with a first end portion 302 in one of the apertures 162 and with a second end portion 304 in an adjacent aperture 162. The tissue fiber 300 is thus caught or lodged on the upstream side 164 of the foraminous member 160. The amount of tissue fibers 300 lodging on the upstream side of the foraminous member 160 could eventually impede, or altogether obstruct, the flow of food material through one or more of the apertures 162 if unidirectional flow of food material continues, and if such accumulated tissue fibers were not removed. In accordance with the present invention, the removal of tissue fibers from the upstream side of the foraminous member is effected in subsequent operational steps of the apparatus as will next be explained.

In FIG. 3 the apparatus 10 is shown in the next step of the sequence wherein the mold or transfer plate 110 has been moved to the second (patty ejecting) position. In this position, the mold opening 119 is spaced away from both the first foraminous member 160 and the second foraminous member or support plate 112. In this position, the mold opening 119 is entirely clear of any portions of the cover plate 52 and of the support plate 112 so that the molded patty, indicated by a reference numeral 400, may be ejected by a suitable patty ejecting mechanism represented generally by numeral 410 in FIG. 3. The patty ejecting mechanism may be of any suitable conventional type and may include a disk-like or cup-like member 412 mounted to a drive rod 414. The ejecting mechanism 410 is intermittently reciprocated in the vertical direction to push the formed patty 400 out of the mold opening 119 when the mold plate 110 periodically moves a molded patty 400 into the patty ejecting position. The construction and operation of the patty ejecting mechanism 410 per se form no part of the present invention.

It may be desirable to provide a suitable molded patty receiving mechanism, such as a conveyor belt 420 illustrated in FIG. 4. The conveyor belt 420 is preferably disposed immediately below the movement plane of the mold plate 110 for receiving the molded patty 400 as it is ejected by the patty ejecting mechanism 410.

When the molded patty is moved to the patty ejecting position as illustrated in FIG. 3, the cleanout opening 118 in the mold plate 110 is necessarily moved into alignment between the first foraminous member 160 and the second foraminous member or support plate 112. Since the cleanout opening 118 presents a volume into which pressurized food material could expand, the pressurization of the food material in the upper or first food material reservoir 154 must be terminated before the mold plate 110 is moved from the first position illustrated in FIG. 2 to the second position illustrated in FIG. 3. To this end, a suitable control system is provided to close the plate 96 in aperture 100. This prevents the pressurized food material in the lower or second food material reservoir 54 from passing into reservoir 154 and exerting pressure upon the material already in the reservoir 154. An example of a suitable control mechanism for closing the plate 96 in the aperture 100 is illustrated and described in the above-referenced Holly patent application Ser. No. 25,031. In particular, attention is directed in that patent application to FIGS 2, 3, 4, and 8 and to the description in the specification relating to the elements designated by reference numerals 82, 84, 86, 87, 88, 90, 92, 94, and 96. The details of the mechanism and control system for closing the gate 96 in the apparatus 10 described herein form no part of the present invention.

In any case, regardless of the specific nature of the means for terminating the pressurization of the food material in the first or upper food material reservoir 154, such termination of the pressure is effected by a suitable means so that the food material does not continue to flow out of the apertures 162 of the first foraminous member 160 and so that no substantial amount of food material flows into the cleanout aperture opening 118 of the mold plate 110 when the mold plate 110 is in the second position illustrated in FIG. 3.

With the food material occupying the first or upper food material reservoir 154 in a de-pressurized condition as illustrated in FIG. 3, a number of food tissue fibers 300 may remain lodged on the upstream side of the foraminous member 160. End portions of the tissue fibers may extend into adjacent apertures 162 and may tend to partially or completely block some of the apertures 162. The tissue fibers 300 that are lodged on the upstream side 164 of the foraminous member 160 are removed by actuating the piston rod 184 in the downward direction to move the probe members 190 into the apertures 162 of the foraminous member 160 as best illustrated in FIG. 4. Preferably, the probe members 190 are inserted into the foraminous member 160 so that the end portions of the probe members 190 extend beyond the upstream side 164 of the foraminous member 160 and thus effectively push the tissue fibers out of the apertures 162 and so that the tissue fibers are thus deposited back in the first or upper food material reservoir 154. Some amount of compression of the food material in the first reservoir 154 may be effected by this operation.

After the probe members 190 have been inserted into the apertures 162 of the first foraminous member 160, the probe members 190 are retracted to the elevated position illustrated in FIG. 1. The food material in the reservoir 154 may expand upwardly a small amount and, in some cases, portions of the food material may be forced part way up some or all of the apertures 162 of the foraminous member 160.

As illustrated in FIG. 4, the patty ejecting mechanism 410 is moved downwardly as indicated by arrow 416 to eject the molded patty 400. This may be effective as soon as the mold plate 110 has been moved to the second (patty ejecting) position illustrated in FIG. 3 and before the probe members 190 has been moved downwardly into the apertures 162 of the foraminous member 160. Alternatively, the patty ejecting mechanism 410 may be actuated simultaneously with the downward actuation of the probe members 190. In still another alternative means of operation, the patty ejecting mechanism 410 may be actuated after the probe members 190 have been moved downwardly. The patty ejecting mechanism 410 may even be actuated after the probe members 190 have been returned to the retracted, elevated position. Of course, to promote rapid and efficient high speed operation, the downward movement of the patty ejecting mechanism 410 would most preferably occur simultaneously with the downward movement of the probe members 190 as illustrated in the preferred embodiment of the apparatus in FIG. 4.

Although the foraminous member 160 apertures 162 each preferably have a cylindrical configuration, and although the probe members 190 each have a corresponding cylindrical configuration, the apertures 162 and probe members 190 may have other cross-sectional shapes. Preferably however, regardless of the specific cross-sectional shape, the probe members 190 have a size only slightly smaller than the size of the receiving apertures 162 to insure that the probe members 190 can effectively clean the tissue fibers out of the apertures 162.

Although the foraminous member apertures 162 are preferably arranged in a uniformly spaced array in a circular area corresponding to a circular mold opening 119 in the mold plate 110, it is to be realized that the apertures 162 may be non-uniformly spaced across the mold opening and/or that the mold opening may have a non-circular configuration. However, from the standpoint of providing a formed or molded patty having a substantially uniform texture across any dimension, the mold opening 119 (and hence the patty) is preferably circular in shape and the apertures 162 are preferably uniformly spaced across the foraminous member 160 below the mold opening 119.

Although the mold plate 110 is illustrated as having a cleanout aperture 118, it is to be realized that the cleanout aperture 118 per se is not essential to providing a molded patty in accordance with the teachings of the present invention. Specifically, with reference to FIG. 3, the mold plate 110 may terminate at some point between the mold opening 119 and the illustrated cleanout opening 118. That is, instead of the mold plate 110 having the specific cleanout aperture 118, the plate 110 would terminate at or short of that region so that the probe members 190 would be free to be moved downwardly into the apertures 162 of the first foraminous member 160 when the mold plate 110 was in the second position illustrated in FIG. 3. Of course, if necessary, additional lateral guiding means or mechanisms may be provided on either side of the mold plate 110 to insure smooth and proper reciprocating operation of the mold plate 110 between the cover plate 52 and the upper support plate 112.

Although the apparatus 10 is illustrated as having a first or upper food material reservoir 154 and a lower or second food material reservoir 54, it is to be realized that only one food material reservoir may be provided below the foraminous member 160. In the case where only one food material reservoir is provided below the first foraminous member 160, suitable pressurization and de-pressurization mechanisms and control systems would have to be provided to insure the proper filling of the mold opening 119 and to insure sufficient de-pressurization of the food material when the mold plate 110 is moved to the molded patty ejecting position illustrated in FIG. 3.

Although the apparatus 10 illustrated in the figures is shown with an upper support plate 112 having apertures 172 for receiving the probe members 190, it is to be realized that such a structure is not necessary to effect the teachings of the present invention. Specifically, the mold plate 110 may have a relative thickness greater than that illustrated in the figures and the mold opening 119 may be a concavity within the mold plate 110 with an opening only on the side of the plate 110 adjacent the foraminous member 160. Movement of such a mold plate to the patty ejecting position would still provide access to the first foraminous member 160 apertures 162 by the probe members 190 and permit insertion of the probe members 190 in the apertures 162. Of course, if the mold plate 110 has such a concave mold opening rather than an aperture, removal of the molded patty from the concave mold opening would have to be effected by means other than that illustrated in the figures. It is to be realized that automatic machine removal of a patty from the mold cavity is not a necessary feature of the invention. It is merely sufficient to move the mold plate 110 away from the foraminous member 160 to expose the downstream side 166 of the foraminous member to the probe members 190. Removal of the formed patty from the mold cavity may be effected by hand.

From the foregoing it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method for forming a patty of plastic food material containing tissue fibers, including ground meat and the like, said method comprising:
   (a) providing a foraminous member having an upstream side and a downstream side with apertures therein communicating between said upstream side and said downstream side;
   (b) providing mold parts defining a mold opening and at least a portion of a mold cavity having the shape of at least a portion of the exterior surface of said patty and positioning said mold parts to dispose said mold opening adjacent said downstream side of said foraminous member;
   (c) forcing said food material under pressure from the upstream side of said foraminous member through said apertures to the downstream side of said foraminous member and into said mold opening as discrete extrudate masses which together define a packed array forming said patty;
   (d) moving at least some of said mold parts away from said foraminous member to carry said formed patty therewith and expose the downstream side of said foraminous member; and
   (e) providing a plurality of rigid probe members, each of said rigid probe members associated with a foraminous member aperture, and inserting said probe members into at least some of said foraminous member apertures from said downstream side for dislodging tissue fibers that may have lodged on the upstream side of said member.

2. The method in accordance with claim 1 in which step (e) includes moving a probe member into an aperture associated therewith by an amount whereby at least a portion of said probe member extends beyond the upstream side of said foraminous member.

3. A method for forming a patty of plastic food material containing tissue fibers, including ground meat and the like, said method comprising:
   (a) providing a first foraminous member having an upstream side and a downstream side and defining apertures extending through said member, providing a movable mold plate on the downstream side of said first foraminous member and defining a mold opening functioning to define at least a peripheral portion of a mold cavity having the shape of said patty and further defining a cleanout opening, said mold plate adapted to be moved between a patty molding position with said mold opening adjacent said first foraminous member and a cleaning position with said cleanout opening adjacent said first foraminous member, providing a second foraminous member defining apertures therein and being spaced from and on the side of the mold plate opposite said first foraminous member, providing rigid probe members disposed within the apertures of said second foraminous member, providing means for reciprocating said probe members from said second foraminous member through said mold plate cleanout opening into said first foraminous member apertures, providing a first food material reservoir adjacent the upstream side of said first foraminous member, providing a second food material reservoir adjacent said first food material reservoir, providing a gate means between said first and second food material reservoirs for blocking communication between said reservoirs and for being moved to permit communication between said reservoirs, and providing means for pressurizing the food material in said second reservoir;
   (b) moving said mold plate to position said mold opening between said first and second foraminous members;
   (c) operating said gate means to allow communication between said first and second food material reservoirs;
   (d) operating said food material pressurizing means to force said food material from said second reservoir to said first reservoir under pressure and through said apertures in said first foraminous member into said mold opening to form a patty;
   (e) operating said gate means to block flow of said food material from said second reservoir to said first reservoir;
   (f) moving said mold plate to move said mold opening with the molded patty carried therein to position said cleanout opening adjacent said first foraminous member and to expose the molded patty for ejection from the mold opening;
   (g) moving said probe members into the apertures of said first foraminous member to dislodge tissue fibers that may be lodged on the upstream side of said first foraminous member and to move said tissue fibers into said first reservoir;
   (h) after step (g), retracting said entering members out of said first foraminous member apertures and out of said mold plate cleanout opening;
   (i) before, after, or during step (g), ejecting the molded patty from said mold plate mold opening; and
   (j) moving said mold plate back to said patty molding position wherein said mold opening is disposed between said first and second foraminous members.

4. A method for forming a patty of plastic food material containing tissue fibers, including ground meat and the like, said method comprising:
(a) providing a foraminous member having an upstream side and a downstream side with apertures therein communicating between said upstream side and said downstream side;
(b) providing means defining a food material reservoir adjacent the upstream side of said foraminous member;
(c) providing mold parts defining a mold opening and at least a portion of a mold cavity having the shape of at least a portion of the exterior surface of said patty and positioning said mold parts to dispose said mold opening adjacent said downstream side of said foraminous member;
(d) forcing said food material under pressure in only one direction from said food material reservoir through said foraminous member apertures and into said mold opening as discrete extrudate masses which together define a packed array forming said patty;
(e) moving at least some of said mold parts away from said foraminous member to carry said formed patty therewith and expose the downstream side of said foraminous member; and
(f) providing probe means for pushing tissue fibers and inserting said probe means through at least some of said foraminous member apertures from said downstream side for dislodging tissue fibers that may have lodged on the upstream side of said member.

5. An apparatus for molding a patty of plastic food material which contains tissue fibers, including ground meat the like, said apparatus comprising:
(a) a foraminous member having a plurality of apertures and having an upstream side and a downstream side;
(b) means defining a food material reservoir adjacent the upstream side of said foraminous member;
(c) a mold plate defining a mold opening adapted to be moved between a first position adjacent said foraminous member said mold opening and a second position spaced away from said foraminous member, said mold opening defining at least a portion of a mold cavity into which food material is forced in only one direction from said food reservoir on the upstream side of said foraminous member through said foraminous member apertures to form a molded patty when said mold plate is moved to said first position;
(d) means for moving said mold plate with said mold opening filled with a patty away from said first foraminous member; and
(e) probe means for pushing tissue fibers, said probe means spaced from said foraminous member and adapted to be moved into the apertures in said foraminous member when said mold plate mold opening is moved away from said first foraminous member whereby tissue fibers that may have lodged on the upstream side of said foraminous member are dislodged and deposited back in said food material reservoir.

6. The apparatus in accordance with claim 5 in which said probe means includes a plurality of probe members, each probe member having a cross-sectional shape substantially geometrically similar to the cross-sectional shape of an associated aperture.

* * * * *